United States Patent
Grobis (10) Patent No.: US 8,773,798 B2
(45) Date of Patent: Jul. 8, 2014

(54) WRITE SYNCHRONIZATION IN BIT PATTERNED MEDIA USING AUXILIARY READ HEAD

(75) Inventor: Michael K. Grobis, San Jose, CA (US)

(73) Assignee: HGST Netherlands B.V., Amsterdam (NL)

(*) Notice: Subject to any disclaimer, the term of this patent is extended or adjusted under 35 U.S.C. 154(b) by 82 days.

(21) Appl. No.: 13/485,879

(22) Filed: May 31, 2012

(65) Prior Publication Data
US 2013/0321947 A1 Dec. 5, 2013

(51) Int. Cl.
*G11B 5/09* (2006.01)
*G11B 5/596* (2006.01)

(52) U.S. Cl.
USPC .................................... 360/51; 360/77.08

(58) Field of Classification Search
None
See application file for complete search history.

(56) References Cited

U.S. PATENT DOCUMENTS

| | | | |
|---|---|---|---|
| 5,325,245 A | 6/1994 | Shimizu et al. | |
| 6,738,207 B1 | 5/2004 | Belser et al. | |
| 6,853,514 B2 * | 2/2005 | Li et al. | 360/77.04 |
| 6,888,694 B2 | 5/2005 | Guo et al. | |
| 6,904,010 B1 | 6/2005 | Kuroba et al. | |
| 6,934,112 B2 | 8/2005 | Ono et al. | |
| 7,609,469 B2 | 10/2009 | Gage et al. | |
| 7,729,074 B2 | 6/2010 | Venkataramani et al. | |
| 7,969,676 B2 | 6/2011 | Buch et al. | |
| 8,077,417 B2 | 12/2011 | Mallary et al. | |
| 2002/0135927 A1 * | 9/2002 | Yatsu | 360/75 |
| 2010/0020435 A1 | 1/2010 | Chen et al. | |
| 2010/0091400 A1 | 4/2010 | Hamaguchi | |
| 2010/0118426 A1 * | 5/2010 | Vikramaditya et al. | 360/51 |
| 2010/0142077 A1 | 6/2010 | Zaitsu et al. | |
| 2010/0238578 A1 | 9/2010 | Ueno | |
| 2010/0329091 A1 | 12/2010 | Gubbins | |
| 2011/0141610 A1 | 6/2011 | Grobis et al. | |
| 2011/0249355 A1 | 10/2011 | Mallary et al. | |

FOREIGN PATENT DOCUMENTS

JP 60/057509 4/1985

* cited by examiner

*Primary Examiner* — Regina N Holder
(74) *Attorney, Agent, or Firm* — Zilka-Kotab, PC (57) ABSTRACT

A method for recording data to a magnetic media while simultaneously reading sync and or servo data with reduced noise from the write head affecting the reading of the sync and or servo data. The invention records data using a write head of a first slider and reads the sync and or servo data from a read head located on a different slider that is facing a different disk surface than the first slider. In this way, magnetic or thermal noise from the write head does not affect the reading of the sync and or servo data.

16 Claims, 7 Drawing Sheets

WRITE SYNCHRONIZATION IN BIT PATTERNED MEDIA USING AUXILIARY READ HEAD

FIELD OF THE INVENTION

The present invention relates to magnetic data recording and more particularly to a magnetic data recording system that provides synchronization data for a first head based on servo data read from a second head on a different slider than the first head.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head can include a magnetic write pole and a magnetic return pole, the write pole having a much smaller cross section at the ABS than the return pole. The magnetic write pole and return pole are magnetically connected with one another at a region removed from the ABS. An electrically conductive write coil is wrapped around the write pole and induces a magnetic flux that magnetizes the write pole when a current is passed through the coil. This results in a magnetic write field being generated through the adjacent magnetic medium, the write field being substantially perpendicular to the surface of the medium (although it can be canted somewhat, such as by a trailing shield located near the write pole). The magnetic write field locally magnetizes the medium and then travels through the medium and returns to the write head at the location of the return pole where it is sufficiently spread out and weak that it does not erase previously recorded bits of data. The polarity of the write field is dictated by the polarity of the write current through the write coil. The polarity is switched based on a write clock whose frequency and phase are controlled to optimize the data write process.

A magnetoresistive sensor such as a GMR or TMR sensor can be employed for sensing magnetic fields from the rotating magnetic disk. The sensor includes a nonmagnetic conductive layer, or barrier layer, sandwiched between first and second ferromagnetic layers, referred to as a pinned layer and a free layer. In a read mode, the resistance of the spin valve sensor changes proportionally to the magnitudes of the magnetic fields from the rotating disk. When a sense current is conducted through the spin valve sensor, resistance changes cause potential changes that are detected and processed as playback signals.

In an effort to increase data density, magnetic recording systems can be constructed to incorporate bit patterned media. Such media can be formed with isolated magnetic data islands, which can be surrounded by non-magnetic material. Bit patterned media can record smaller bits of data at higher data density than would be possible with a standard media, while being magnetically stable at higher data densities. However, bit patterned media present a challenge to the write process as precise registration and timing are required between the locations of the patterned islands and application of the write fields. Missynchronization and misregistration can cause islands to be magnetized incorrectly, potentially leading to the loss of customer data. What is needed is a precise method for maintaining synchronization during the write process and a method for inhibiting the write process if synchronization or registration is lost.

SUMMARY OF THE INVENTION

The present invention provides a method for magnetic data recording that includes writing data to a first magnetic disk surface using a read head of a first slider, and reading sync information from second magnetic disk surface using a magnetic read head of a second slider. An adjustment is made to the write clock of the write head of the first slider based on the sync data read by the read head of the second slider.

The invention can be embodied in a magnetic disk drive system that includes, a magnetic disk having a first surface and a second surface opposite the first surface, each surface of the magnetic disk having sync and servo information thereon. A first magnetic slider faces the first side of the magnetic disk and has a magnetic write element formed on the first slider. A second magnetic slider faces the second side of the magnetic disk and has a read head formed on the second slider for reading sync information from the second side of the magnetic disk. Electronics are connected between the controls for the write current for the write head of the first slider and the signal processing electronics for the read head of the second slider, the connecting electronics being functional to adjust a write clock for the write element of the first slider based on the sync data read from the read head of the second slider.

The invention advantageously allows the write clock frequency and phase to be updated during writing of data without noise from the write head affecting the reading of the sync data. The invention is particularly advantageous for use in a disk drive that incorporates bit patterned media, since such systems use frequent accurate updating of sync data. The invention can also be used to read servo data during writing to determine whether a projected off track excursion is going to exceed a predetermined acceptable value. In the event such a projected off track excursion does exceed a predetermined value, a write inhibit can be initiated to avoid loss of data.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
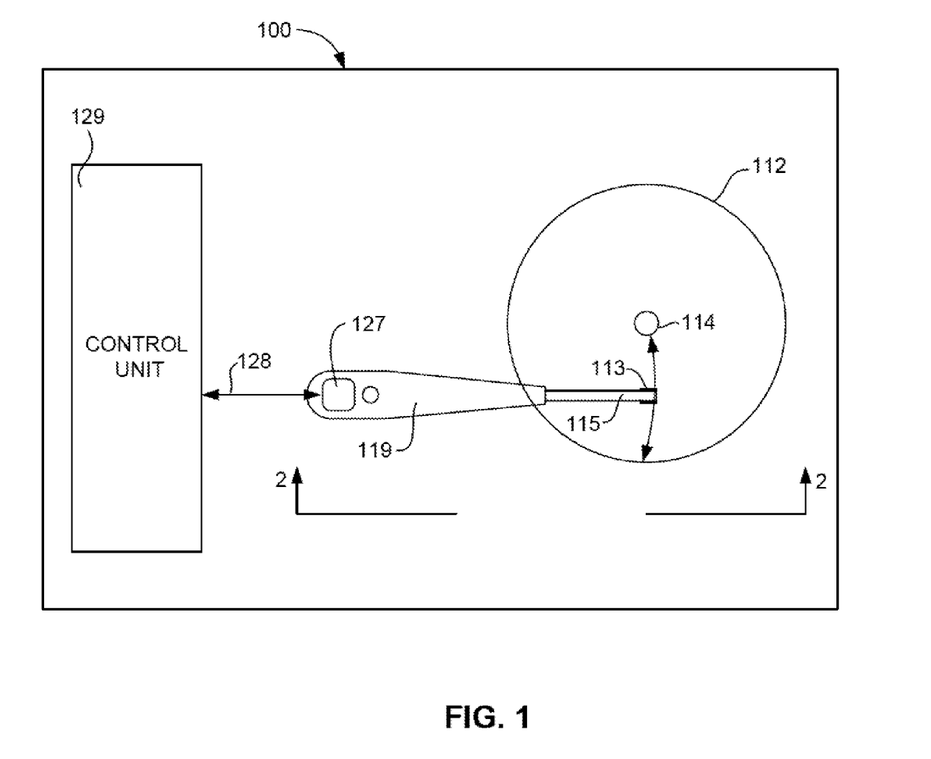
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle. The magnetic recording on each disk is in the form of annular patterns of concentric data tracks (not shown) on the magnetic disk 112.

At least one slider 113, having a magnetic head formed on its trailing edge, is positioned near the magnetic disk 112. As the magnetic disk rotates, slider 113 moves radially in and out over the surface of the disk 112 so that the magnetic head assembly of the slider 113 can access different tracks of the magnetic disk where desired data are written and read. Each slider 113 is attached to an actuator arm 119 by way of a suspension 115. The suspension 115 provides a slight spring force which biases slider 113 against the disk surface 112. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the surface of the disk 112 which exerts an upward force or lift on the slider. The air bearing thus counterbalances the slight spring force of suspension 115 and supports slider 113 off and slightly above the surface of the disk 112 by a small, substantially constant spacing during normal operation.

The various components of the disk storage system are controlled in operation by control signals generated by control unit 129. Typically, the control unit 129 comprises a system interface, data storage cache, microprocessor, and subsystem electronics. The control unit 129 generates control signals to control various system operations such as head position and seek control signals on line 128. The control signals on line 128 provide the desired current profiles to optimally move and position slider 113 to the desired data track on disk 112. In addition, the control unit houses electronics for sensing and processing signals from the read head, as well as controlling currents for the write head.

Figure 2:
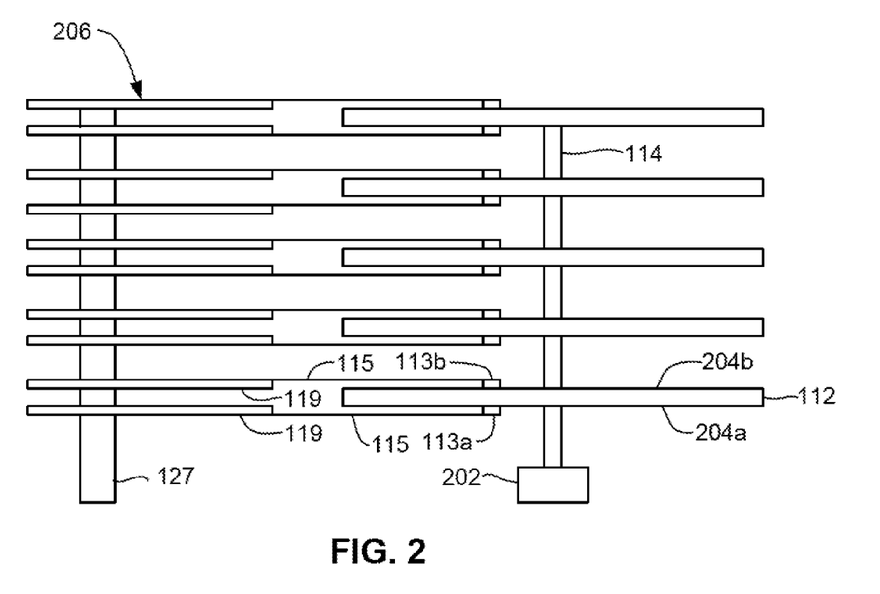
FIG. 2 is a side schematic view as seen from line 2-2 of FIG. 1.

FIG. 2 shows a side view of a portion of the disk drive system as seen from line 2-2 of FIG. 1. As shown in FIG. 2, the disk drive system includes a stack of several magnetic disks 112 each of which are held on a spindle 114, which can be attached to a motor 202 for rotating the disks 112. Each of the disks has a bottom surface 204a and an upper surface 204b.

The system also includes a spindle assembly 206 formed as a stack actuator arms 119, suspensions 115 and sliders 113 some of which are configured to record to a bottom surface 204a of a disk 112 and some of which are configured to record to an upper surface 204b of a disk 112.

Figure 3:
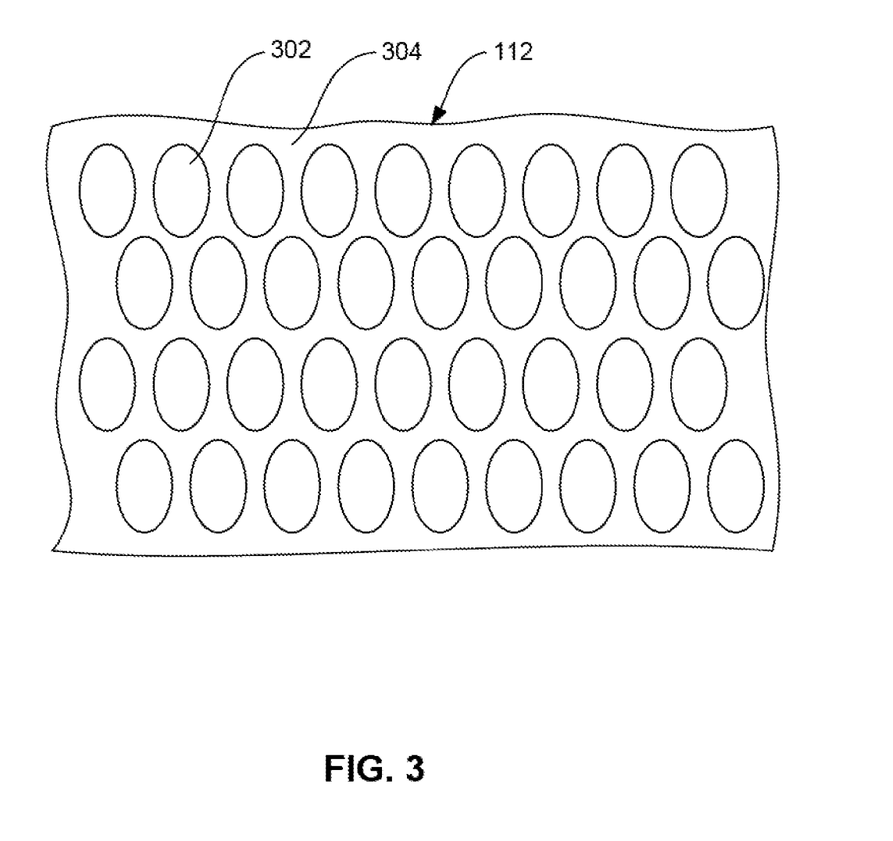
FIG. 3 is an enlarged view of a portion of a bit patterned media.

As discussed above, in order to increase data density, a magnetic recording system can be constructed to incorporate bit patterned media. FIG. 3 shows an enlarged view of a small portion of a surface 204 of a magnetic disk 112 (FIG. 2). As shown in FIG. 3, the media 112 can include a plurality of magnetic islands 302, which are surrounded by non-magnetic material 304 or empty space. Although the islands 302 are shown as being elliptical in FIG. 3, they could be various other shapes, such as rectangular, square, round, etc. The use of discrete magnetic islands 302 allows magnetic data to be recorded at greater data areal density while still being thermally stable, this stability being provided by the larger size of the magnetic islands 302 relative to the grains in conventional media at comparable areal density.

Figure 4:
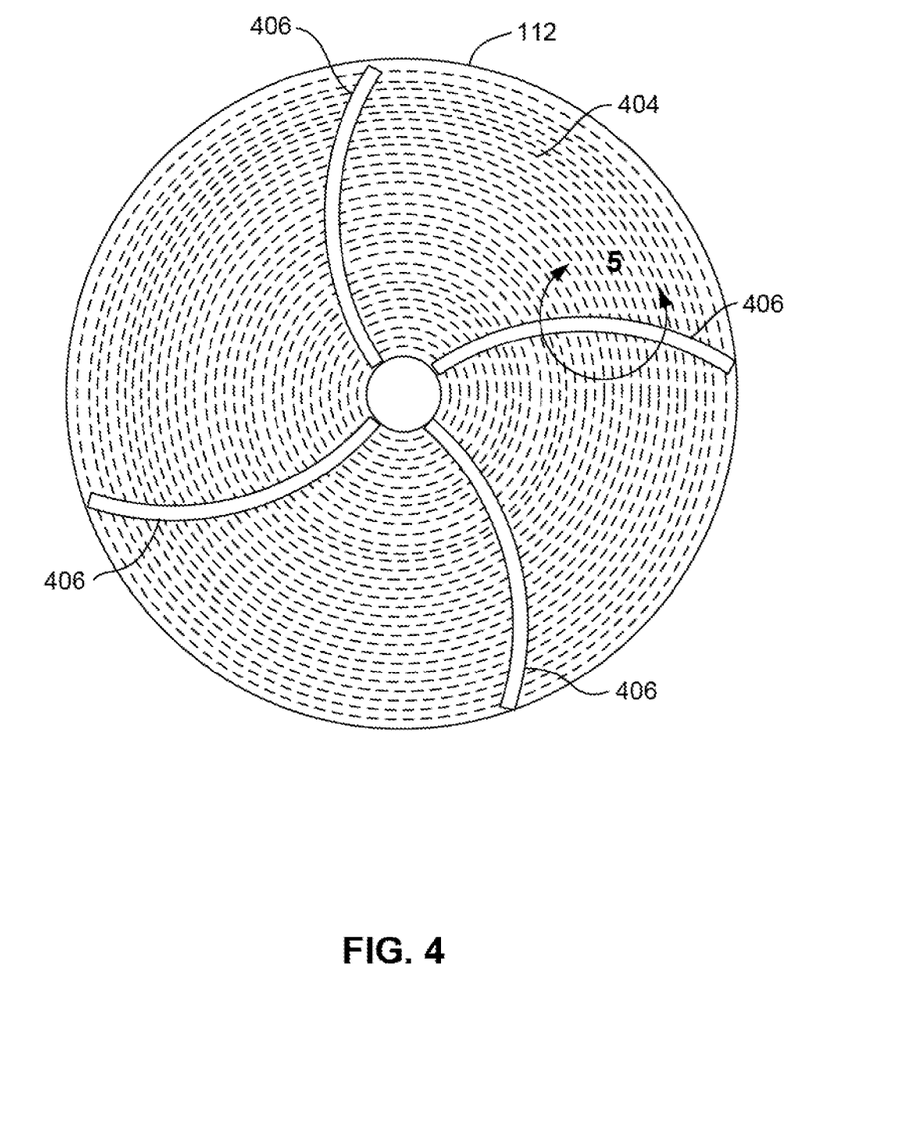
FIG. 4 is a top down view of a magnetic media showing data tracks and servo sectors.

FIG. 4 shows a top down view of an entire magnetic disk 112. As shown in FIG. 4, the disk 112 includes a plurality of concentric data tracks 404. The closer together the data tracks are, the higher the data density can be. The disk 112 also includes plurality of servo sectors 406, which extend radially outward from the center of the magnetic disk. The servo sectors 406 can have a curved shape as shown in FIG. 4 in order to account for arc of the slider 113 as it travels over the disk 112 when moved by the actuator arm (as seen in FIG. 1).

Figure 5:
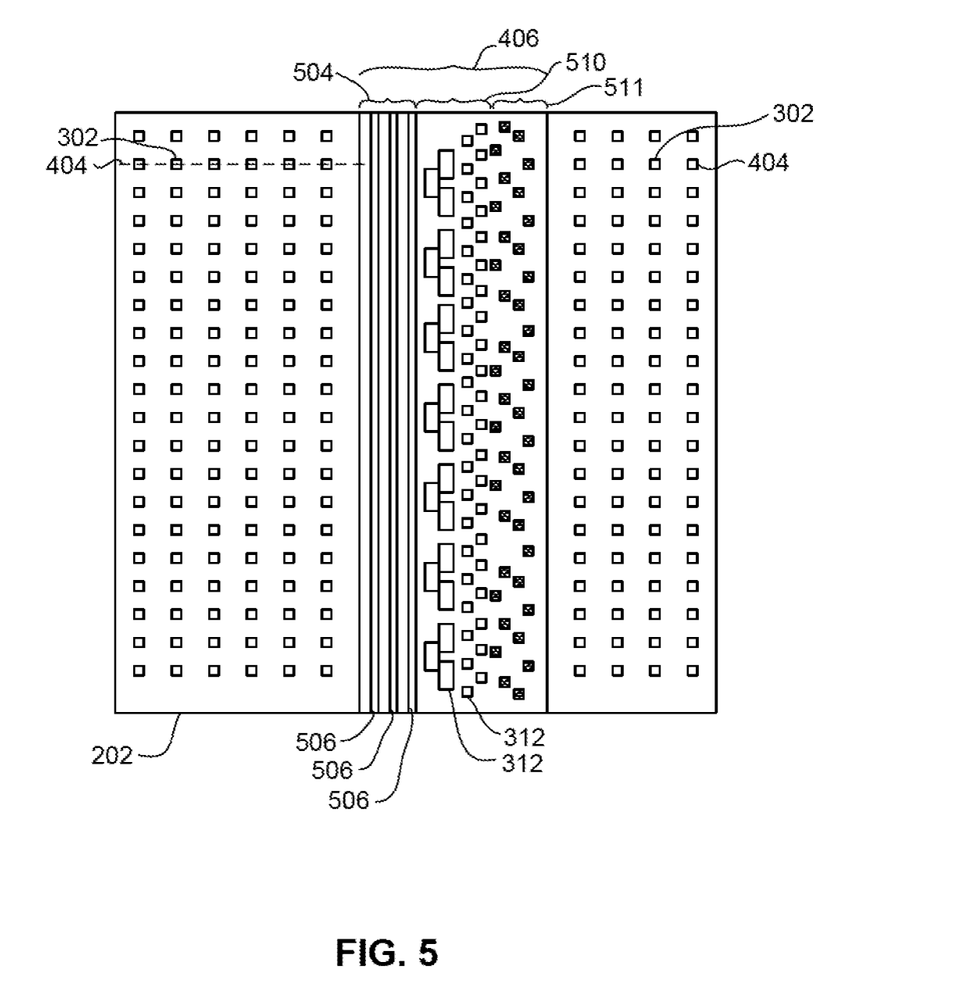
FIG. 5 is an enlarged view showing a servo sector of a magnetic media.

FIG. 5 shows an enlarged view of a portion of the disk 112 indicated by circle 5 in FIG. 4. FIG. 5 shows a portion of the servo sector 406 with the data tracks 404 on either side of the servo sector. The data tracks 404 include individual data islands 302. Although shown as squares in FIG. 5, the data islands 302 could be some other shape, such as elliptical as shown in FIG. 3. The servo structure shown in FIG. 5 represents magnetic contrast that could be gained through patterning, self-servo writing, or a combination of both. At one side of the servo sector 406 is a timing track section 504, which includes a series of timing tracks 506 that are spaced apart by a desired spacing and which allow the signal processing hardware to establish speed and timing of the slider over the data track region before reaching a servo data region 510. The servo data track region 510 includes a series of servo data bits 312 that are configured to allow signal processing electronics to determine the coarse radial location of the slider over the disk media 112. The servo sector 406 also includes a fine position error signal (PES) section 511 having features such as ABCD bursts (shown shaded), null servo patterns (not shown) and chevrons (not shown). The servo patterns can also contain features that represent the sector ID. The order of the various servo fields can vary. In addition the PES and sync fields can be placed along side data without additional servo features 312.

Attaining accurate clock timing is important to proper functioning of the magnetic disk drive. As mentioned above, this timing is achieved by reading the timing data bits 506 in the servo sector 406. Maintaining proper timing becomes even more important and more challenging when using a bit patterned media such as that described herein, because the timing or writing must coincide with the location of the data bits 302 on the media. The use of longer data block sizes poses an additional challenge as the write synchronization needs to be accurate for a longer period of time. Achieving good synchronization thus requires either very high precision and a quiet operation environment or more frequent updating of the write clock during the write. Several methods for maintaining write-synchronization during the write process have been proposed, including capacitive methods, thermal methods and optical methods. However these hybrid methods are fraught with significant complexity of integrating non-magnetic detection apparatus in a disk drive. What is needed is a less costly method for improving synchronous writing for bit-patterned recording.

The present invention provides a method for more frequent optimization of the write clock in bit patterned media recording. In order to implement the present invention, a read head on a slider other than the one used to write data is used to read timing and servo data. A problem that arises with prior art servo processes is that the writing process can actually interfere with the reading of the servo track data. The present invention overcomes this challenge by reading servo data using a read head located on a different slider than that on which the writing head is located.

Referring again to FIG. 2, the write head of a first slider (for example slider 113a) is to be used to write data to a surface 204a of a disk 112. This slider 113a will be referred to as the active slider and the write head formed thereon (not shown in FIG. 2) will be referred to as an active write head. Another slider (for example, slider 113b) will be used to read servo data from a different disk surface than that to which the active slider 113a is writing. This other slider 113b will be referred to herein as an auxiliary slider 113b. Because the read and write heads on the auxiliary slider 113b are not on the active slider 113a, they do not experience the magnetic and electrostatic interferences that they would if they were on the active slider 113a. Hence the auxiliary read head on the auxiliary slider 113b can be used to accurately read synchronization fields on their respective disk surfaces in order to monitor spindle motor speed variations and drive disturbances. This has the advantage over previous processes in that it does not require additional electronics or complexity to implement. The invention allows a relaxation of the specifications for servo accuracy and allowed drive disturbances, which in turn allows higher areal densities.

In a typical bit patterned media disk drive system, the optimal write clock frequency and phase is determined immediately prior to writing by reading a sync field 504 (FIG. 5) using the read head located on the same slider body as the write head that will perform writing. The writing starts soon afterwards, and the read head is generally inoperable during writing due to the coupling of the electronic and magnetic noise generate by the write process to the read-back signal. While inventions have been proposed to combat this coupling, these solutions can interfere with other optimizations of the read and write head connector design. Read heads located on sliders other than the active slider and active write head do not suffer the same noise coupling. Since a typical disk drive contains 1-9 additional sliders, the read heads on these sliders can cleanly read synchronization and servo fields on their respective disk surfaces. This information can then be used to update the write frequency and phase on the write clock used for the active writing.

As those skilled in the art will appreciate, disk flutter and head stack vibrations can cause displacements among the sliders in the spindle stack assembly 206 (FIG. 2). The differential displacements, however, only affect the write clock to the second order, as the primary vibration mode is in the cross track direction. Hence, while the cross-track displacement information gained through the auxiliary heads might be inaccurate for the active writer, the write clock information will be much more accurate. In order to minimize variations between the active slider 113a and the auxiliary slider 113b, the slider chosen as the auxiliary slider is preferably the slider that faces the opposite side of the same disk 112 that the active slider 113a faces (as shown in FIG. 2). This ensures that the information provided by the auxiliary reader matches the active writer position most accurately. In this embodiment, the write process starts in the typical fashion. Once writing has started, the auxiliary reader and read electronics await the passage of sync fields and servo fields. The sync information from these sync fields is then processed to account for the phase differences between the servo fields on the disk surface 204b facing the auxiliary slider 113b. Then, the write clock for the active writer is updated to reflect the new information.

Figure 6:
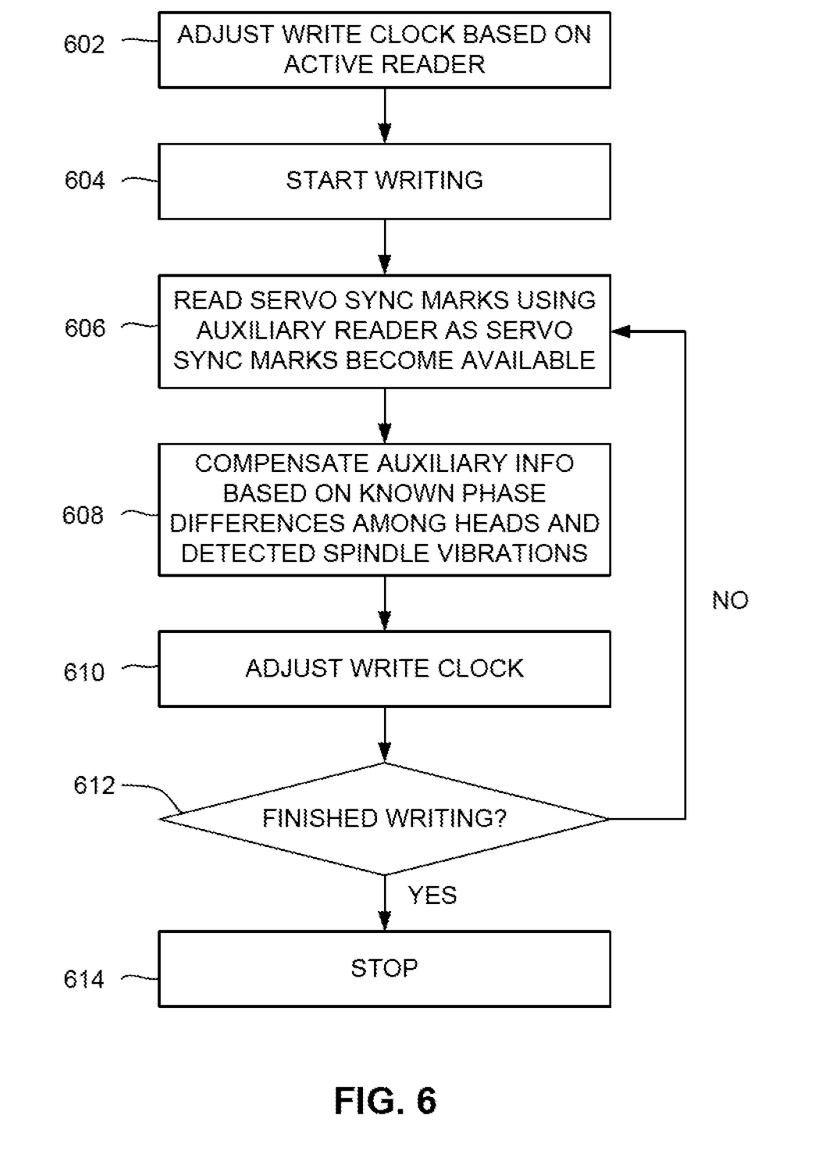
FIG. 6 is a flowchart illustrating a method for magnetic data recording according to an embodiment of the invention.

FIG. 6 schematically illustrates a process according to the above described process. First, in a step 602 the write clock is adjusted based on the active reader located on the same slider as the active writer which will be writing data. Then, in a step 604 writing initiates using the active writer located on the active slider. In step 606 an auxiliary reader located on an auxiliary slider is used to read servo sync marks as they become available. In a step 608 a compensation is made to the auxiliary sync information based on known phase differences between active and auxiliary heads and detected spindle vibrations. Then, in a step 610 a write clock adjustment is made based on the compensated auxiliary sync information. Then, in a decision step 612 a determination is made as to whether writing is complete. If writing is finished, then the process stops (step 614). If writing is not finished, then the process returns to step 606 to again read auxiliary servo sync marks as they become available.

Due to variations in fabrications and disk assembly, the sync patterns on the various disk surfaces will not be phase aligned. In addition it is possible that the different disk surfaces have slightly different alignment between the center of the patterns and the center of disk rotation. The misalignment will be characterized during drive initialization, as is disclosed in the prior art. The misalignment causes a phase offset and frequency offset to be added to the phase and frequency deduced by the auxiliary head. The offsets depend on the disk surfaces of the primary and auxiliary heads. Depending on pattern properties and degree of misalignment, the offsets can depend on the radial and circumferential positions of the primary and auxiliary heads.

In another aspect of the invention, the auxiliary reader can be used to deduce cross track servo information to determine if a cross track excursion has exceeded a predetermine acceptable limit. Detecting cross track excursions is more difficult, because the spindle stack has differential vibrations. The vibrational modes of the stack are known and can be detected in the cross track position signal. However, the vibrations of the head stack can be compensated for by measuring the cross-track amplitude of each of the head displacements and fitting them to the known vibrational modes of the head assembly. The vibrational mode information is then fed forward to compensate for the gradual changes in the write clock frequency as the active write head traverses the sector. The system can invoke a write inhibit signal if the system detects that an excursion will occur that exceeds the limit specified by the servo system.

Figure 7:
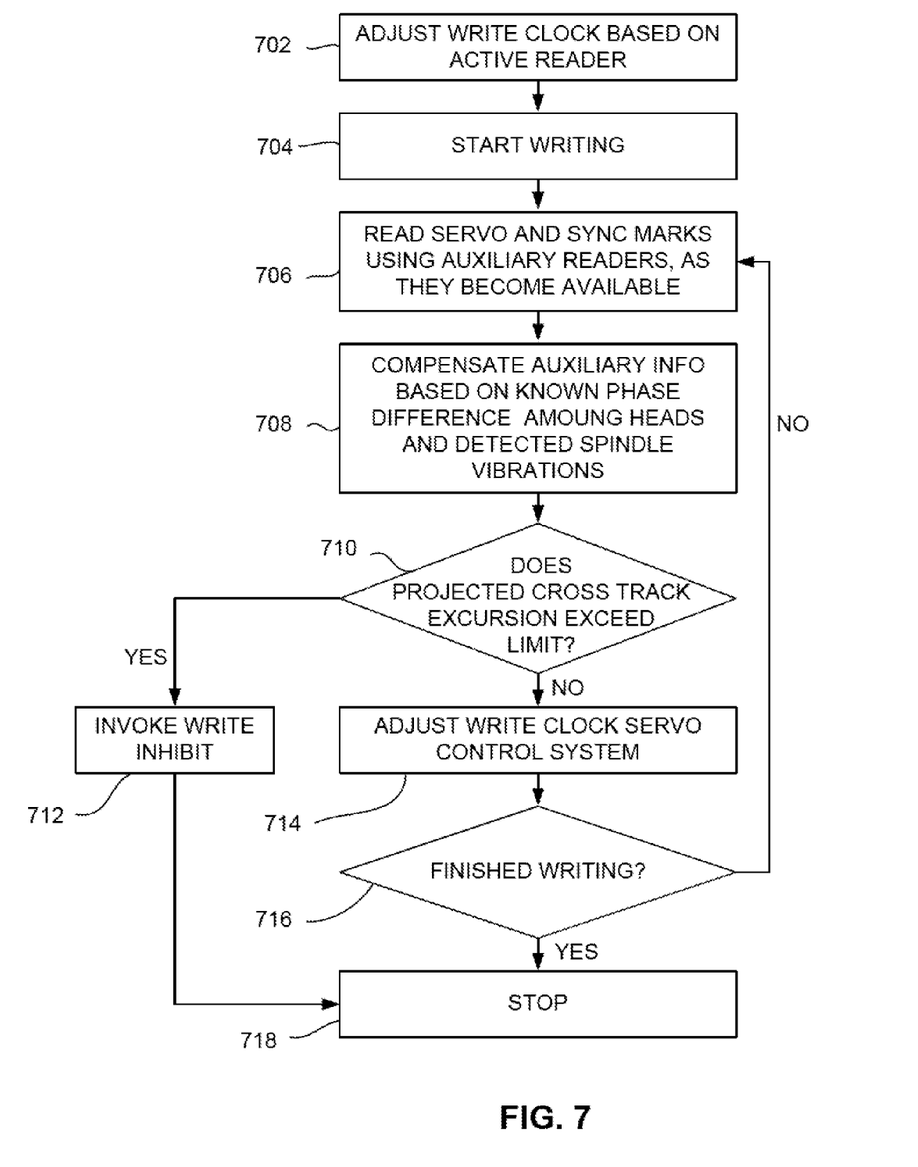
FIG. 7 is a flowchart illustrating a method for magnetic data recording according to an alternate embodiment of the invention.

FIG. 7 schematically illustrates a process according to this aspect of the invention. In a step 702 a write clock adjustment is made using an active reader located on an active slider on which the active writer is located. Then, in a step 704 writing is initiated using the active writer located on the active slider. In a step 706, while writing is being performed, an auxiliary reader located on an auxiliary slider that is different from the active slider is used to read servo and sync marks as they become available. In a step 708 a compensation is made to the auxiliary servo and sync information based on a known phase difference between the active and auxiliary heads. In a decision step 710 a determination is made as to whether a projected cross track excursion exceeds a predetermined limit based on the compensated servo data. If the projected cross track excursion does exceed the predetermined limit, then in a step 712 a write inhibit is invoked and the writing is terminated 718. If the projected cross track excursion does not exceed the predetermined limit then the process proceeds to step 714 wherein the write clock servo control system is adjusted based on the compensated auxiliary sync information. Then, in a decision step 716 a determination is made as to whether the writing process has been finished. If the answer is yes, then the write process is terminated 718. If the answer is no, then the process returns to step 706 to again read servo and sync marks as they become available using the auxiliary read head located on the auxiliary slider.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic data recording system, comprising:
a magnetic disk having a first surface and a second surface opposite the first surface, each surface of the magnetic disk having sync and servo information thereon;
a first magnetic slider facing the first surface of the magnetic disk and having a magnetic write element formed thereon;
a second magnetic slider facing the second surface of the magnetic disk and having a read head formed thereon for reading sync information from the second surface of the magnetic disk; and
electronics connected with the write head of the first slider and the read head of the second slider, the electronics being functional to adjust a write clock for the write element of the first slider based on the sync data read from the read head of the second slider;
wherein the electronics is further functional to compensate sync data read by the read head of the second slider based on a known phase difference between the first slider and the second slider.

2. The data recording system as in claim 1 wherein the magnetic read head of the second slider reads servo information from the second surface of the magnetic disk, and wherein the electronics are functional to determine a projected cross track excursion based on the servo information.

3. The data recording system as in claim 2 wherein electronic are further functional to invoke a write inhibit if cross track excursion exceeds a predetermined value.

4. The magnetic data recording system as in claim 1 wherein the magnetic disk is a bit patterned magnetic media.

5. A magnetic data recording system, comprising:
a disk assembly that includes a plurality of magnetic disks each having first and second surfaces, each of the disk surfaces including data tracks and a servo sector that includes sync information and servo information;
a spindle assembly that includes a plurality of sliders arranged such that each slider faces a surface of a magnetic disk of the disk assembly, each slider having a read head and a write head; and
electronics functional to write data using a write head of a first slider, and to read sync data using a read head of a second slider that is different from the first slider;
wherein the electronics are further functional to compensate the sync data read from the read head of the second slider based on a known phase difference between the first slider and the second slider.

6. The magnetic data recording system as in claim 5, wherein the electronics are further functional to adjust a write clock of the write head of the first slider based on the sync data read from the read head of the second slide.

7. The magnetic data recording system as in claim 5 wherein the electronics are further functional to read servo data using the read head of the second slider and to generate a projected cross track excursion of the write head of the first slider based on the servo data.

8. The magnetic data recording system as in claim 7 wherein the electronics are further functional to invoke a write inhibit if the projected cross track excursion exceeds a predetermined value.

9. A method for magnetic data recording, comprising:
writing data to a first magnetic disk surface using a read head of a first slider;
reading sync information from second magnetic disk surface using a magnetic read head of a second slider; and
adjusting a write clock of the writing by the write head of the first slider based on the sync data read by the read head of the second slider;
wherein the reading of sync data by the read head of the second slider is performed while the writing is being performed by the write head of the first slider.

10. The method as in claim 9 wherein the first magnetic disk surface and the second magnetic disk surface are surfaces of the same disk.

11. The method as in claim 9 wherein first magnetic disk surface and the second magnetic disk surface are surfaces of different magnetic disks.

12. The method as in claim 9 further comprising:
reading servo data using the read head of the second slider; and
determining a projected cross track excursion of the write head of the first slider based on the servo data read by the read head of the second slider.

13. The method as in claim 12 further comprising invoking a write inhibit if the projected cross track excursion exceeds a predetermined value.

14. The method as in claim 9 further comprising compensating the sync information based on a known phase difference between the first and second sliders.

15. The method as in claim 9 wherein the first and second disk magnetic disk surfaces are configured as bit patterned media.

16. The method as in claim 9 further comprising before writing data using the write head of the first slider, reading sync data using a read head of the first slider and adjusting the write clock for the writer based on the sync data read by the read head of the first slider.

* * * * *